(12) United States Patent
Cermak

(10) Patent No.: US 8,322,941 B2
(45) Date of Patent: Dec. 4, 2012

(54) CONNECTING ASSEMBLY WITH SECURING RING

(75) Inventor: Herbert Cermak, Bessenbach (DE)

(73) Assignee: GKN Driveline Deutschland GmbH, Offenbach (DE)

( * ) Notice: Subject to any disclaimer, the term of this patent is extended or adjusted under 35 U.S.C. 154(b) by 420 days.

(21) Appl. No.: 12/370,177

(22) Filed: Feb. 12, 2009

(65) Prior Publication Data

US 2009/0208278 A1 Aug. 20, 2009

(30) Foreign Application Priority Data

Feb. 14, 2008 (DE) .......................... 10 2008 009 361

(51) Int. Cl.
F16D 1/116 (2006.01)
(52) U.S. Cl. ..................... 403/359.5; 403/317; 403/318; 403/332
(58) Field of Classification Search ............... 403/359.1, 403/359.5, 359.6, 379.6, 316, 317, 318, 319, 403/332, 355, 375
See application file for complete search history.

(56) References Cited

U.S. PATENT DOCUMENTS

| 3,922,011 | A | | 11/1975 | Walters | |
|---|---|---|---|---|---|
| 4,699,403 | A | * | 10/1987 | Wong | 285/233 |
| 4,818,166 | A | * | 4/1989 | Szukay et al. | 403/261 |
| 4,947,975 | A | | 8/1990 | Tojima | |
| 5,014,840 | A | | 5/1991 | Tojima | |
| 5,447,342 | A | * | 9/1995 | Mazhar | 285/314 |
| 5,632,568 | A | * | 5/1997 | Fechter | 403/325 |
| 5,749,606 | A | * | 5/1998 | Lu et al. | 285/86 |
| 5,876,071 | A | * | 3/1999 | Aldridge | 285/321 |
| 6,105,456 | A | * | 8/2000 | Higashino et al. | 74/492 |
| 6,186,697 | B1 | * | 2/2001 | Masuda et al. | 403/359.5 |
| 6,267,528 | B1 | * | 7/2001 | Higashino | 403/359.5 |
| 6,582,151 | B2 | * | 6/2003 | Hopson | 403/359.5 |
| 7,722,089 | B2 | * | 5/2010 | Nauer | 285/321 |

FOREIGN PATENT DOCUMENTS

| DE | 30 27 267 | 2/1982 |
|---|---|---|
| DE | 197 53 781 | 6/1999 |
| DE | 103 43 749 | 4/2005 |
| EP | 0 253 968 | 1/1988 |

OTHER PUBLICATIONS

English Language Abstract for DE 197 53 781.
English Language Abstract for DE 103 43 749.
English Language Abstract for US 4,818,166 (corresponding to EP 0 253 968).

* cited by examiner

Primary Examiner — Michael P Ferguson
(74) Attorney, Agent, or Firm — Rader, Fishman & Grauer, PLLC

(57) ABSTRACT

A connecting assembly for transmitting torque comprising a shaft journal with an outer annular groove and a hollow shaft with an inner annular groove, wherein, for torque transmitting purposes, the hollow shaft is rotationally fixed to the shaft journal and comprises at least one recess towards the outer circumferential face of the hollow shaft in a partial circumferential region of the inner annular groove. The connecting assembly also includes a radially elastically widenable axial securing ring which is positioned in the outer annular groove of the shaft journal and in the inner annular groove of the hollow shaft, wherein the axial securing ring comprises at least one outwardly projecting projection which is arranged in the at least one recess of the hollow shaft, and securing means which cover the at least one recess and prevent the axial securing ring from being radially widened.

17 Claims, 2 Drawing Sheets

CONNECTING ASSEMBLY WITH SECURING RING

CROSS REFERENCE TO RELATED APPLICATION

This application claims priority to DE 102008009361.0, filed Feb. 14, 2008, which is hereby incorporated by reference in its entirety.

TECHNICAL FIELD

The disclosure relates to a connecting assembly comprising a shaft with outer teeth and a hub with inner teeth, wherein the shaft and the hub are inserted into one another in a rotationally fixed way. The connecting assembly more particularly refers to interengaging teeth on driveshafts, for example between a hollow shaft and a shaft journal inserted into the latter, or between an inner joint part of a constant velocity universal joint and a shaft journal inserted into same, or between a joint journal of an outer joint part, which joint journal is inserted into a wheel hub or into hollow shaft of a gearbox.

BACKGROUND

From DE 103 43 749 A1 there is known a shaft/hub connecting assembly. The shaft and the hub each comprise an outer shoulder, with the two shoulders, in the inserted condition, being arranged so as to axially adjoin one another. An axial securing element is provided which grips the two shoulders from the outside by plastic deformation.

EP 0 253 968 A1 proposes a fixing assembly between a shaft and a component fixed on said shaft, for instance a toothed gear, by means of a closed securing ring. After the securing ring has been made to contact the component and has engaged an annular groove of the shaft, said securing ring is plastically radially inwardly deformed in partial regions of its circumference. As a result of the plastic deformation, there are produced bulges in the intermediate partial regions, which bulges project from the annular groove and which, at a later stage, permit dismantling, with the securing ring being destroyed.

From DE 197 53 781 C2, there is known a device for clamping and centering two components by means of a spring ring. The spring ring comprises peaks and valleys which form radially and axially resilient regions. The radially resilient regions are used to center the two components relative to one another.

In certain applications, it is difficult to connect a shaft to a hub because, under certain circumstances, the available installation space is limited. At the same time, shaft/hub connecting assemblies in the driveline of a motor vehicle are subject to requirements demanding optimum anti-releasing conditions and a minimum adverse effect on the strength of the components.

SUMMARY

A connecting assembly for torque transmitting purposes is provided, comprising a shaft journal with an outer annular groove; a hollow shaft with an inner annular groove, wherein, for torque transmitting purposes, the hollow shaft is rotationally fixed to the shaft journal and comprises at least one recess which is open towards the outer circumferential face of the hollow shaft in a partial circumferential region of the inner annular groove; a radially elastically widenable axial securing ring which is positioned in the outer annular groove of the shaft journal and in the inner annular groove of the hollow shaft, wherein the axial securing ring comprises at least one outwardly projecting projection which is arranged in the at least one recess of the hollow shaft; and securing means which cover the at least one recess and prevent the axial securing ring from being radially widened.

An advantage of the connecting assembly is that it is possible to achieve secure axial fixing conditions between the hollow shaft and the shaft journal. The design only has a minimum influence on the strength of the shaft journal, because it is possible to use axial securing rings whose shape only requires a slight change in the cross-section of the shaft journal and whose cross-sections permit the use of grooves with a small notch factor. The depth of the annular groove of the shaft journal, into which annular groove the axial securing ring is inserted, is preferably less than half the radial extension of the axial securing ring, if viewed in the cross-section through a circumferential region outside the at least one projection. A further advantage refers to the simple design of the connecting assembly which consists of only a few parts, which has an advantageous effect on production costs. The installation space required for the assembly is small and the components can be easily mounted and dismantled.

For mounting purposes, the axial securing ring is inserted into the annular groove of the hollow shaft and the hollow shaft is slid onto the shaft journal. The axial securing ring is preferably radially widened by an end cone of the shaft journal and snaps inwardly when it reaches the journal groove. In this way, the axial securing ring is radially inwardly pretensioned, i.e. it is arranged with pretension in the annular groove of the shaft journal. If required, the connecting assembly can easily be released by axially widening the axial securing ring, with the functional ability of the individual components being retained in full. In principle, the securing ring can be provided as a continuously closed ring, but also as an open ring.

The at least one projection is preferably a bulge of the closed ring, which bulge can also be referred to as an outward curvature. For fixing the ring relative to the shaft journal particularly securely, it is advantageous if there is provided a plurality of projections around the circumference. In principle, the number of bulges is freely selectable, with a number of at least three, more particularly four radial bulges being particularly advantageous, because then the axial securing ring is radially supported in several regions around the circumference. Preferably, the projections are uniformly distributed around the circumference.

In partial circumferential regions of the inner annular groove, the hollow shaft preferably comprises a plurality of recesses towards the outer circumferential face, into which recesses the projections of the ring extend, with the number of recesses corresponding at least to the number of the projections of the securing ring, so that each projection is accommodated in an associated recess. In a cross-sectional view, the recesses are just large enough to accommodate the projections without having more space for elastic deformation than necessary for mounting purposes. Furthermore, the recesses extend in the axial direction as far as the end face of the hollow shaft, so that the axial securing ring with its projections can be introduced into the hollow shaft in the coaxial direction relative to same. To ensure reliably secured conditions, the tolerances of the components are such that the projections of the securing ring in the slid-on condition on the shaft journal in which the securing ring has not yet snapped into the annular groove, radially project from the outer circumferential face of the hollow shaft. When the radially elastic axial securing ring has snapped into the annular groove of the shaft journal, the at least one projection extends radially approximately as far as the outer circumferential face of the hollow shaft.

The cross-section of the ring is preferably designed in such a way that, in the inserted condition, an axial relative movement of the ring relative to the shaft journal causes the ring to be elastically widened. This can be achieved for example by a round, an oval or a trapezoidal cross-section of the securing ring. The advantage of this design is that by applying an axial force, the assembly can be easily dismantled provided the securing means preventing the securing ring from being widened have been removed. A further advantage consists in that the ring is positioned in the shaft groove in an axially play-free way. Furthermore, the annular groove can have a correspondingly round cross-section, which has an advantageous effect on the strength of the shaft journal.

According to one arrangement, the securing means for preventing the axial securing ring from radially widening is a sleeve which is arranged on the hollow shaft and covers the at least one recess. In the slid-on condition of the sleeve, the projections of the securing ring rest against the inner face of the sleeve, so that the axial securing ring is prevented from widening. A particularly secure connection is achieved if the sleeve in the region of overlap with the recesses is reinforced, for example by inner reinforcement means. The slid-on sleeve ensures that, in an advantageous way, radial widening of the axial securing ring is prevented at least to the extent that it can no longer by pressed out of the annular groove of the shaft journal.

The sleeve preferably comprises an inner annular bead which engages behind an outwardly projecting shoulder of the hollow shaft or engages an outer annular groove of the hollow shaft. The sleeve is fixed by a binding element which, more particularly, by axially covering the at least one recess, is clamped onto the sleeve. The binding element is preferably designed in such a way that it cannot be slipped onto the sleeve unless the annular bead of the sleeve engages behind the shoulder of the hollow shaft. This measure prevents unintentional faults in assembly. Furthermore, according to one embodiment, the sleeve comprises an inwardly extending radial portion which can rest against the end face of the hollow shaft to form an assembly stop. At the radially inner end of the radial portion, the sleeve is provided with sealing means which sealingly rest on the shaft journal, thus preventing dirt from entering the connecting assembly.

To provide a rotationally fixed connection between the hollow shaft and the shaft journal, there are preferably provided splines. The hollow shaft comprises inner shaft splines into which there is inserted the shaft journal with outer shaft splines. For production reasons it is advantageous if the annular groove of the hollow shaft and the annular groove of the shaft journal into which the axial securing ring is inserted are arranged axially outside the respective shaft splines. Due to this measure, there is no need for the shaft splines to be machined subsequently.

BRIEF DESCRIPTION OF THE DRAWINGS

Referring now to the drawings, illustrative embodiments are shown in detail. Although the drawings represent some embodiments, the drawings are not necessarily to scale and certain features may be exaggerated, removed, or partially sectioned for illustrative purposes. Further, the embodiments set forth herein are exemplary and are not intended to be exhaustive or otherwise limit or restrict the claims to the precise forms and configurations shown in the drawings and disclosed in the following detailed description.

DETAILED DESCRIPTION

Figure 1:
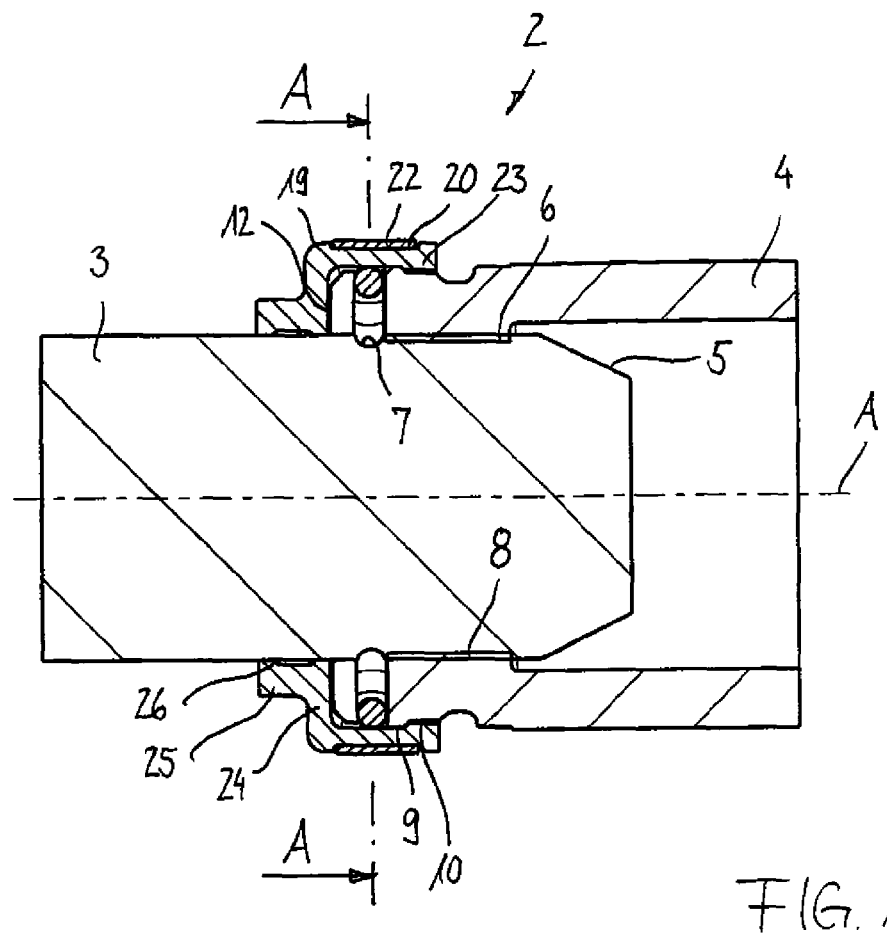
FIG. 1 is a longitudinal section through a connecting assembly between a shaft journal and a hollow shaft according to an embodiment.
Figure 2:
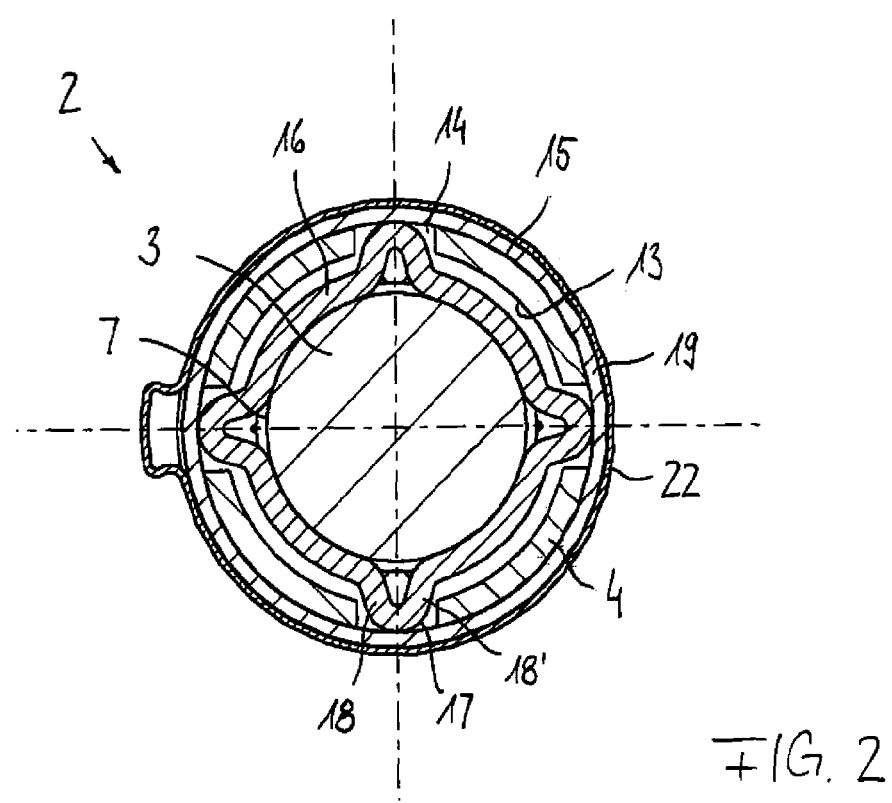
FIG. 2 shows the connecting assembly of FIG. 1 in a cross-sectional view along sectional line A-A.

FIGS. 1 and 2 described jointly below show a connecting assembly 2 for transmitting torque between a shaft journal 3 and a hollow shaft 4. The hollow shaft 4 can also be referred to as the hub, so that, overall, it is also possible to speak of a shaft/hub connection.

Such connecting assemblies are used in the driveline of a motor vehicle where torque has to be transmitted from one component to another component, one example being driveshafts wherein a hollow shaft of a first shaft part is connected to a shaft journal of a second shaft part, or a connection between the inner joint part of a constant velocity universal joint and a shaft journal inserted into same, or between the joint journal of an outer joint part, which shaft journal is inserted into a hollow shaft or wheel hub.

The shaft journal 3 of which only the end is shown comprises a conical end portion 5, outer shaft splines 6 and an outer annular groove 7. More particularly, it is proposed that the annular groove 7 is arranged so as to axially adjoin the run-out of the shaft splines 6, so that there is no need for subsequently machining the shaft splines 6 after having been inserted into the annular groove 7.

The hollow shaft 4 of which only the end is shown, at its free end, comprises inner shaft splines 8 which correspond to the outer shaft splines 6. The inner splines 8 of the hollow shaft 4 and the outer splines 6 of the shaft journal 3 engage one another, so that torque can be transmitted between said two components. As is particularly obvious from FIG. 2, the hollow shaft 4 comprises an inner annular groove 13 at a short axial distance from its end face 12. In the assembled condition, i.e. when the shaft journal 3 is inserted into the hollow shaft 4, the inner annular groove 13 of the hollow shaft 4 and the outer annular groove 7 of the shaft journal 3 are positioned in one plane. Furthermore, the hollow shaft 4 comprises a plurality of recesses 14 which, more particularly, are uniformly distributed around the circumference and extend radially as far as the outer circumferential face 15 of the hollow shaft 4. In the axial direction, the recesses 14 are open towards the end face 12 of the hollow shaft 4. Axially adjacent to the annular groove 13, the hollow shaft 4 comprises an outer shoulder 9 which extends more particularly in a rotationally symmetric way around the entire circumference. Axially adjacent to the shoulder 9 there is formed a continuous recess 10 whose function will be explained below.

Furthermore, the connecting assembly 2 comprises a radially elastically widenable axial securing ring 16 which is arranged in the outer annular groove 7 of the shaft journal 4 and in the inner annular groove 13 of the hollow shaft 3, as well as securing means 19 which prevent axial widening of the axial securing ring 16. It can be seen that the securing means 19 is a sleeve which is positioned on the hollow shaft 4 and covers the recesses 14. On its outer face, the sleeve 19 comprises an annular groove 20 into which there is clamped a binding element 22. To that extent, the binding element 22 represents secondary securing means since it fixes the sleeve 19 relative to the hollow shaft 4 and prevents an undesirable disconnection.

As is particularly obvious from FIG. 2, the axial securing ring 16 comprises a plurality of projections 17 which project radially outwardly and which are received in the recesses 14 of the hollow shaft 4. The projections 17 are bulges of the axial securing ring 16 which, starting from the basically circular shape of the ring 16, comprise two radially outwardly projecting, inter-connected webs 18, 18'. In one embodiment, the axial securing ring 16 comprises exactly four projections 17 which are uniformly circumferentially distributed, so that if axial forces occur between the shaft journal 3 and the hollow shaft 4, the axial securing ring 16 is subjected to radially inwardly directed counter forces acting in four regions around the circumference. In this way, undesirable widening and thus an undesirable release of the shaft/hub connection 2 are avoided. The illustrated axial securing ring 16 is a continuously closed ring, with the bulges 17 ensuring that the ring is able to widen elastically when being slid onto the conical face 5. However, a slotted ring can also be used. The profile of the axial securing ring 16 is such that the application of an axial force causes an elastic widening of the securing ring 16. In this way, the connecting assembly can be easily dismantled by pulling the hollow shaft 4 off the shaft journal 3 after the securing sleeve 19 has been removed. For this purpose, the axial securing ring 16 has been given a round profile, but other cross-sectional shapes such as an oval or trapezoidal cross-section are also conceivable. The annular groove 7 of the shaft journal 3, if viewed in a cross-section through the groove, also has a round profile.

At its end facing the hollow shaft 4, the sleeve 19 comprises an inner annular bead 23 which engages behind the outwardly projecting shoulder 9 of the hollow shaft 4 and, respectively engages the continuous recess 10. Furthermore, the sleeve 19, at its end facing the shaft journal 3, comprises an inwardly extending radial portion 24. While the sleeve 19 is slid onto the hollow shaft 4, the radial portion 24 comes into contact with the end face 12 of the hollow shaft 4, thus forming an assembly stop. In said end position, the annular bead 23 snaps into the recess 10 and extends behind the shoulder 9, so that the sleeve 19 is axially secured relative to the hollow shaft 4. At the radially inner end of the radial portion 24, there is formed a sealing portion 25 which extends in the axial direction and comprises sealing means 26. The sealing means 26 are sealing lips which sealingly rest on the outer face of the shaft journal 3. The sealing means 26 thus prevent dirt from entering the connecting assembly.

For further securing the sleeve 19, there is provided a binding element 22 which, after the sleeve 19 has been slid on, is clamped onto same while axially covering the recesses 14. The cross-section of the binding element 22 is such that it cannot be slid on the sleeve 19 and fixed thereon unless the sleeve 19 is accurately fixed on the hollow shaft 4, i.e. if the annular bead 23 engages behind the shoulder 9. This kind of design ensures that the connecting assembly is accurately assembled.

Assembling the connecting assembly takes place in such a way that the axial securing ring 16 is pre-assembled in one of the two annular grooves 7, 13. While the securing ring 16 is slid onto the shaft journal 3, the radial projections 17 are pressed radially outwardly. In the widened condition of the axial securing ring 16, i.e. when the shaft splines 8 of the hollow shaft 4 are in a position between the conical face 5 and the annular groove 7 of the shaft journal 3, the projections 17 clearly project radially outwardly beyond the circumferential face 15 of the hollow shaft 4. While the securing ring 16 is entering the other annular groove 13, 17, the projections 17 move radially inwardly and are then positioned approximately in the region of the outer circumferential face 15 of the hollow shaft 4. Subsequently, the sleeve 19 which was previously slid onto the shaft journal 3, is being slid onto the hollow shaft 4 until the radial portion 24 stops against the end face 12 and until the annular bead 23 snaps into the annular recess 10. Finally, the binding element 22 is clamped onto the sleeve 19, so that the sleeve 19 is secured against being disconnected and as a result, the axial securing ring 16 is secured against any undesirable widening.

Figure 3:
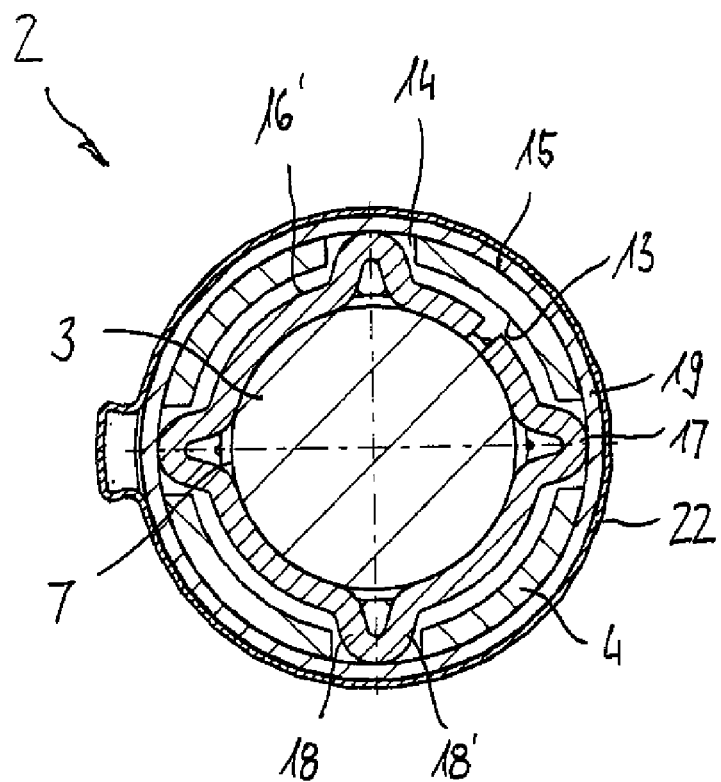
FIG. 3 shows a connecting assembly between a shaft journal and a hollow shaft in a cross-sectional view, with an open securing ring.

The embodiment shown in FIG. 3 largely corresponds to that illustrated in FIGS. 1 and 2. To that extent, reference is made to the above description, with corresponding components having been given the same reference numbers. The only difference refers to the design of the axial securing element 16' which is, in fact, an open ring and, to that extent, can be referred to as a snap ring. It can be seen that one of the annular portions comprises a point of separation 27 between two circumferentially adjoining projections 17. This results in a greater radial elasticity of the axial securing ring 16' which can easily be slid axially onto the shaft journal 3.

Figure 4:
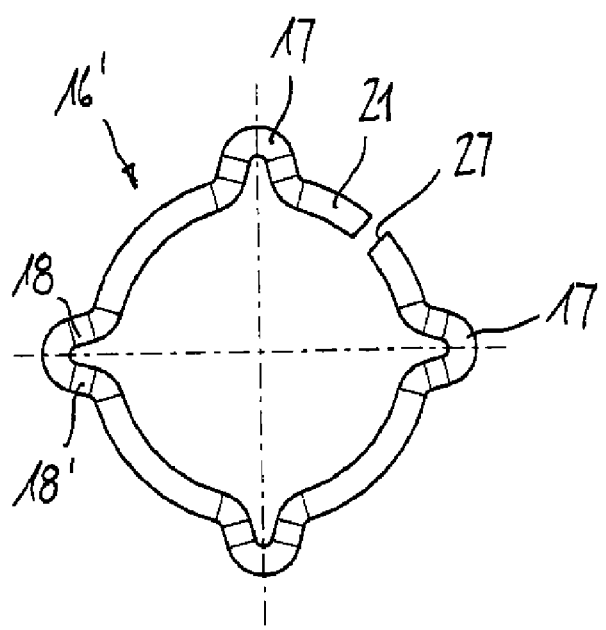
FIG. 4 shows the securing ring according to FIG. 3 in the form of a detail.

FIG. 4 shows the axial securing ring 16' in the form of a detail in an axial view.

The connecting assemblies 2 are advantageous in that they allow a reliable and simply constructed axial connection between the hollow shaft 4 and the shaft journal 3. Because the axial securing ring 16 is secured against radial widening, the annular groove 7 of the shaft journal 3, in which the axial securing ring 16, 16' is received, can comprise a minimum depth and an advantageous cross-section. This has an advantageous effect on the strength of the shaft journal 3 because cross-sectional weakening and notch effects are minimised. Furthermore, to achieve axial security, there is required only a small number of parts. If required, the connecting assemblies can be disconnected, so that the functional ability of the individual components is maintained in full.

The invention claimed is:

1. A connecting assembly for transmitting torque comprising:
   a shaft journal with an outer annular groove;
   a hollow shaft with an inner annular groove, an inner face of said hollow shaft being rotationally fixed to an outer face of the shaft journal for transmitting torque and wherein the hollow shaft comprises at least one recess which is open towards an outer circumferential face of the hollow shaft in a partial circumferential region of the inner annular groove;
   a radially elastically widenable axial securing ring which is positioned in the outer annular groove of the shaft journal and in the inner annular groove of the hollow shaft, wherein the axial securing ring comprises at least one outwardly projecting projection which is arranged in a respective one of the at least one recess of the hollow shaft;
   a sleeve positioned on the outer face of the hollow shaft and which covers the at least one recess and prevents extension of the projection through the recess and prevents radial widening of the axial securing ring; and
   a binding element secured around a portion of the sleeve such that the binding element is positioned over the at least one recess to prevent removal of the sleeve from the recess and prevent radial widening of the axial securing ring.

2. The connecting assembly according to claim 1, wherein the at least one projection of the axial securing ring extends radially as far as the outer circumferential face of the hollow shaft.

3. The connecting assembly according to claim 1, wherein the axial securing ring is a closed ring.

4. The connecting assembly according to claim 1, wherein the at least one projection is an outward bulging portion of the axial securing ring.

5. The connecting assembly according to claim 1, wherein the axial securing ring comprises at least three projections.

6. The connecting assembly according to claim 5, wherein the projections are uniformly distributed around the circumference of the axial securing ring.

7. The connecting assembly according to claim 1, wherein in partial circumferential regions of the inner annular groove, the hollow shaft comprises a plurality of radial recesses towards the outer circumferential face into which radial recesses the projections of the axial securing ring extend.

8. The connecting assembly according to claim 1, wherein the cross-section of the axial securing ring and the cross-section of the inner annular groove is such that an axial relative movement between the shaft journal and the hollow shaft causes a radially elastic widening of the axial securing ring when the sleeve is removed from the at least one recess.

9. The connecting assembly according to claim 1, wherein the sleeve comprises an annular bead which extends behind an outwardly projecting shoulder of the hollow shaft.

10. The connecting assembly according to claim 9, wherein the binding element is clamped onto the sleeve.

11. The connecting assembly according to claim 10, wherein an inner diameter of the binding element is configured such that the binding element can only be slipped onto the sleeve if the annular bead of the sleeve has snapped radially inwardly so as to extend behind the shoulder of the hollow shaft.

12. The connecting assembly according to claim 1, wherein the sleeve comprises an inwardly extending radial portion which abuts an end face of the hollow shaft.

13. The connecting assembly according to claim 1, wherein the hollow shaft comprises inner shaft splines for providing a rotationally fixed connection with the shaft journal, wherein the inner annular groove of the hollow shaft, into which the axial securing ring is inserted is arranged so as to be axially spaced from the inner shaft splines.

14. The connecting assembly according to claim 1, wherein the shaft journal comprises outer shaft splines for providing a rotationally fixed connection with the hollow shaft, wherein the outer annular groove of the shaft journal into which the axial securing ring is inserted is arranged so as to be axially spaced from the outer shaft splines.

15. The connecting assembly according to claim 1, wherein the axial securing ring comprises four projections.

16. A connecting assembly for transmitting torque comprising:
a shaft journal with an outer annular groove;
a hollow shaft with an inner annular groove, wherein an inner face of the hollow shaft is rotationally fixed to an outer face of the shaft journal for transmitting torque and wherein the hollow shaft comprises at least one recess which is open towards an outer circumferential face of the hollow shaft in a partial circumferential region of the inner annular groove;
a radially elastically widenable axial securing ring which is positioned in the outer annular groove of the shaft journal and in the inner annular groove of the hollow shaft, wherein the axial securing ring comprises at least one outwardly projecting projection which is arranged in a respective one of the at least one recess of the hollow shaft;
a sleeve positioned on the outer face of the hollow shaft and which covers the at least one recess and prevents extension of the projection through the recess and prevents radial widening of the axial securing ring; and
a binding element secured around a portion of the sleeve such that the binding element is positioned over the at least one recess to prevent removal of the sleeve from the recess and prevent radial widening of the axial securing ring;
wherein the depth of the outer annular groove of the shaft journal, in which the axial securing ring is positioned, is less than half the radial extension of a cross-section of the axial securing ring.

17. A connecting assembly for transmitting torque comprising:
a shaft journal with an outer annular groove;
a hollow shaft with an inner annular groove, an inner face of said hollow shaft being rotationally fixed to an outer face of the shaft journal for transmitting torque and wherein the hollow shaft comprises at least one recess which is open towards an outer circumferential face of the hollow shaft in a partial circumferential region of the inner annular groove;
a radially elastically widenable axial securing ring which is positioned in the outer annular groove of the shaft journal and in the inner annular groove of the hollow shaft, wherein the axial securing ring comprises at least one outwardly projecting projection which is arranged in a respective one of the at least one recess of the hollow shaft; and
an annular sleeve that is circumferentially closed, positioned on the outer face of the hollow shaft and which covers the at least one recess and prevents extension of the projection through the recess and prevents radial widening of the axial securing ring, wherein the sleeve comprises an annular bead which extends behind an outwardly projecting shoulder of the hollow shaft to prevent removal of the sleeve from the recess and prevent radial widening of the axial securing ring.

* * * * *